(12) United States Patent
Cercone et al.

(10) Patent No.: US 10,350,842 B2
(45) Date of Patent: Jul. 16, 2019

(54) SYSTEM FOR APPLYING A WEB AROUND A CYLINDRICAL OBJECT WITH EVEN TENSION

(71) Applicant: Milliken Infrastructure Solutions, LLC, Spartanburg, SC (US)

(72) Inventors: Lawrence Cercone, Littleton, CO (US); James M. Souza, Houston, TX (US)

(73) Assignee: Milliken Infrastructure Solutions, LLC, Spartanburg, SC (US)

( * ) Notice: Subject to any disclaimer, the term of this patent is extended or adjusted under 35 U.S.C. 154(b) by 276 days.

(21) Appl. No.: 15/428,254

(22) Filed: Feb. 9, 2017

(65) Prior Publication Data

US 2018/0222138 A1  Aug. 9, 2018

(51) Int. Cl.
| | | |
|---|---|---|
| B29C 73/10 | (2006.01) | |
| B29C 73/12 | (2006.01) | |
| B29L 23/00 | (2006.01) | |
| F16L 55/18 | (2006.01) | |
| B65B 67/08 | (2006.01) | |

(52) U.S. Cl.
CPC .............. *B29C 73/10* (2013.01); *B29C 73/12* (2013.01); *B29L 2023/22* (2013.01); *B65B 67/085* (2013.01); *B65H 2402/41* (2013.01); *B65H 2402/412* (2013.01); *F16L 55/18* (2013.01); *Y10T 156/1348* (2015.01); *Y10T 156/1788* (2015.01)

(58) Field of Classification Search
CPC .............. B65B 67/085; B65H 2402/41; B65H 2402/412; Y10T 156/1348; Y10T 156/1788; F16L 55/18
USPC .............................. 156/187, 195, 307.1, 579
See application file for complete search history.

(56) References Cited

U.S. PATENT DOCUMENTS

| | | | | |
|---|---|---|---|---|
| 4,248,392 A | * | 2/1981 | Parry | B65B 67/085 |
| | | | | 242/422.1 |
| 4,369,934 A | | 1/1983 | Spies | 242/157.1 |
| 4,600,163 A | * | 7/1986 | Hummel | B65B 67/085 |
| | | | | 242/422.1 |
| 4,722,493 A | * | 2/1988 | Parry | B65B 67/085 |
| | | | | 242/422.4 |
| 5,509,696 A | | 4/1996 | Smith et al. | 285/27 |
| 6,024,135 A | | 2/2000 | Nobileau | 138/134 |
| 8,567,448 B2 | | 10/2013 | Stringfellow et al. | 138/98 |
| 8,567,450 B2 | | 10/2013 | Stringfellow et al. | 138/98 |
| 9,057,473 B2 | | 6/2015 | Souza | 138/97 |
| 2006/0175459 A1 | * | 8/2006 | Hua | B65H 75/245 |
| | | | | 242/571.7 |
| 2011/0095123 A1 | * | 4/2011 | Bologna | B65B 67/085 |
| | | | | 242/422.4 |
| 2014/0041793 A1 | * | 2/2014 | Morrison | B29C 65/00 |
| | | | | 156/191 |

* cited by examiner

*Primary Examiner* — Carson Gross
(74) *Attorney, Agent, or Firm* — Cheryl J. Brickey

(57) ABSTRACT

A system for applying a web around a cylindrical object with even tension containing a core having a generally cylindrical shape and a pair of handles. Each handle has an insertion area, a collar area, and a gripping area. The collar area is sandwiched between the insertion area and the gripping area and the insertion diameter is less than the inner diameter of the core at the first end and second end. The handles and core have a means for coupling meaning that the core and the insertion area of the handles do not move independently from one another.

9 Claims, 5 Drawing Sheets

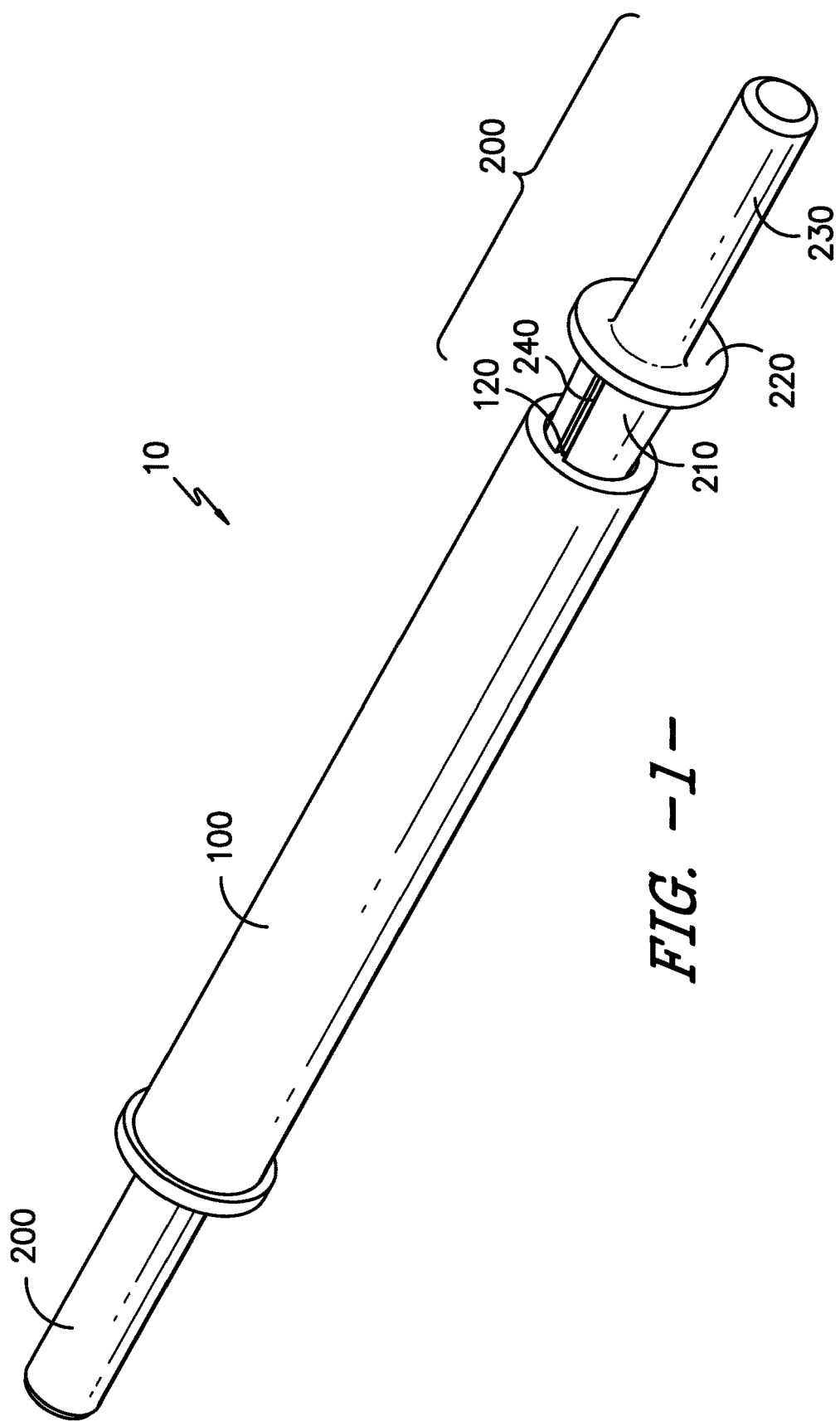
FIG. -1-

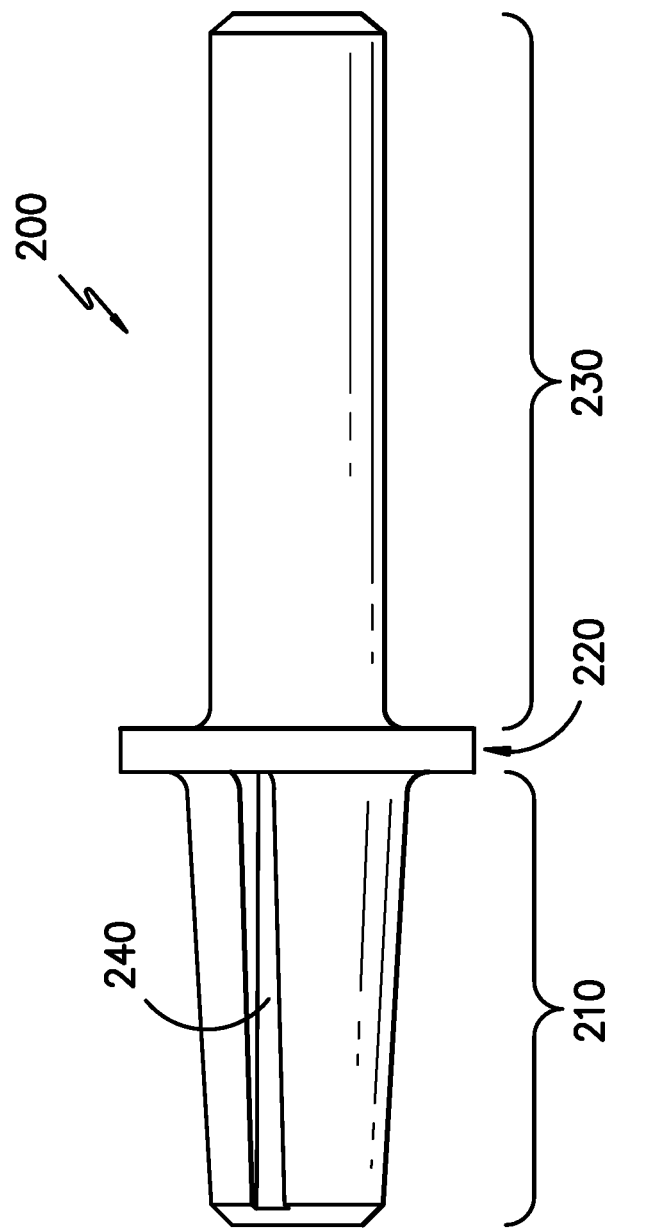

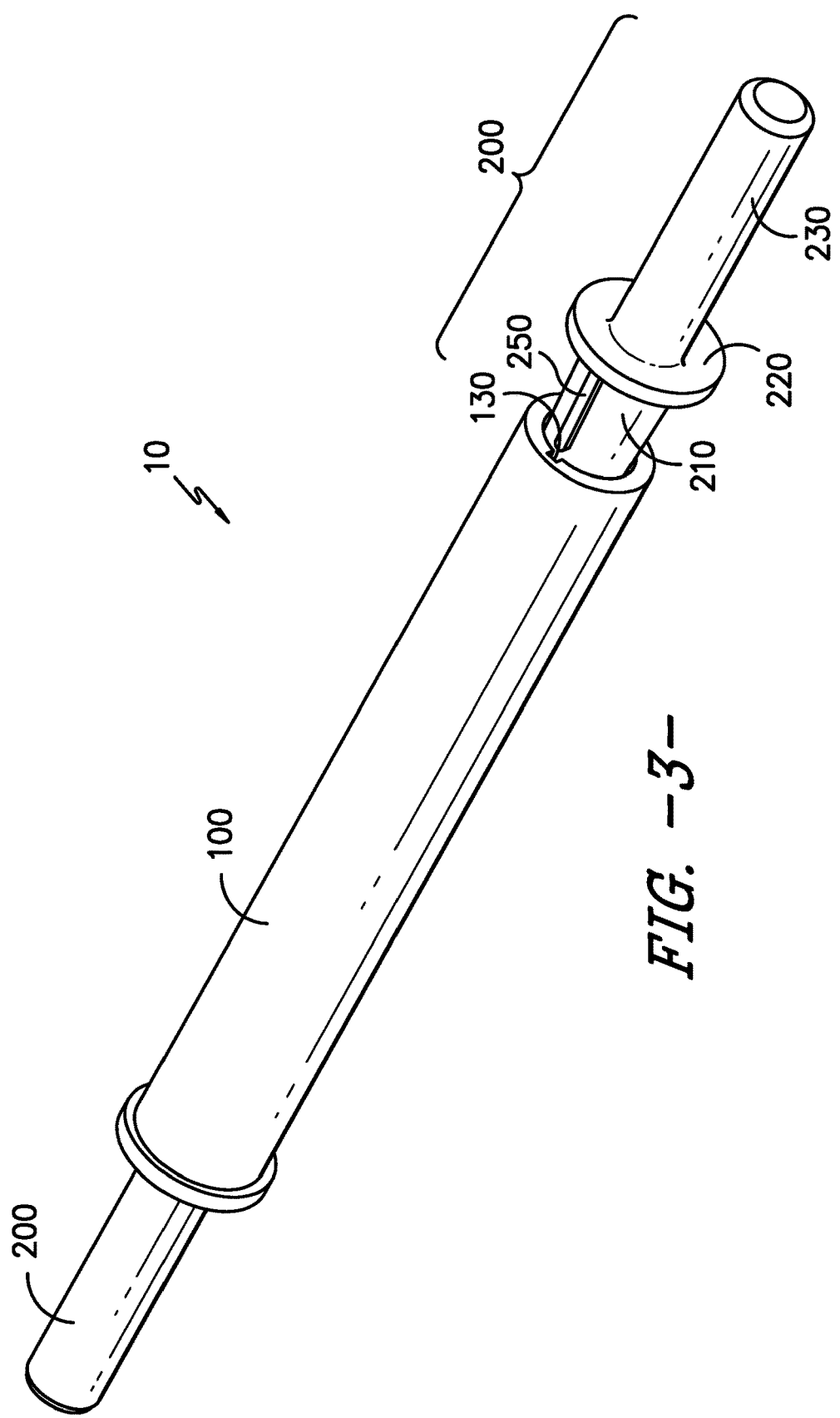
FIG. -3-

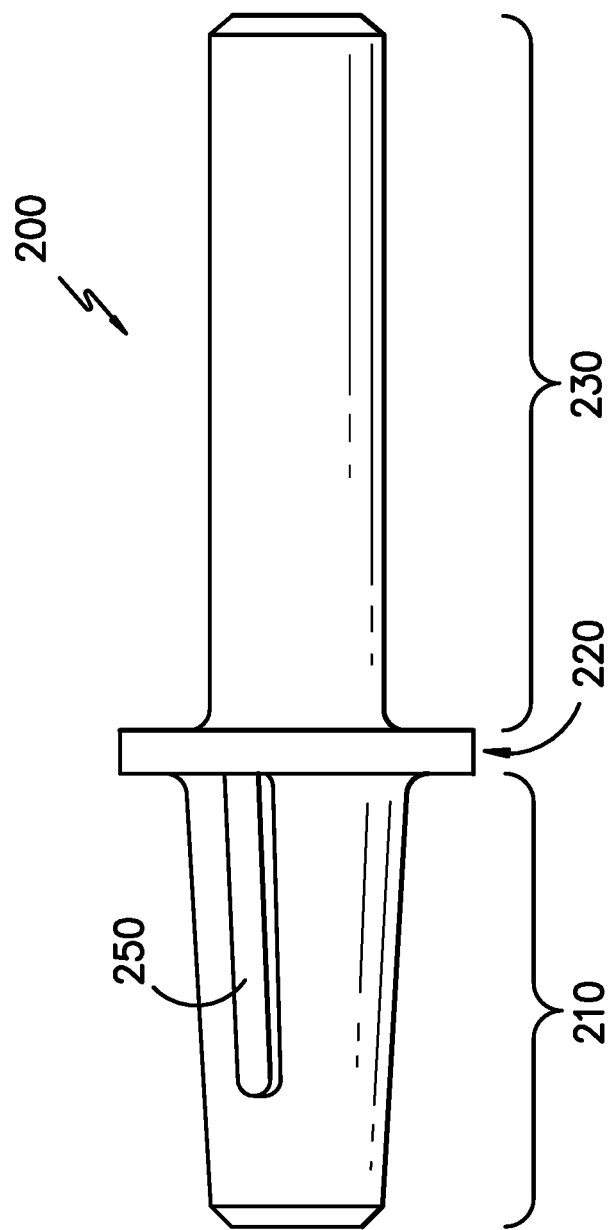
FIG. -4-

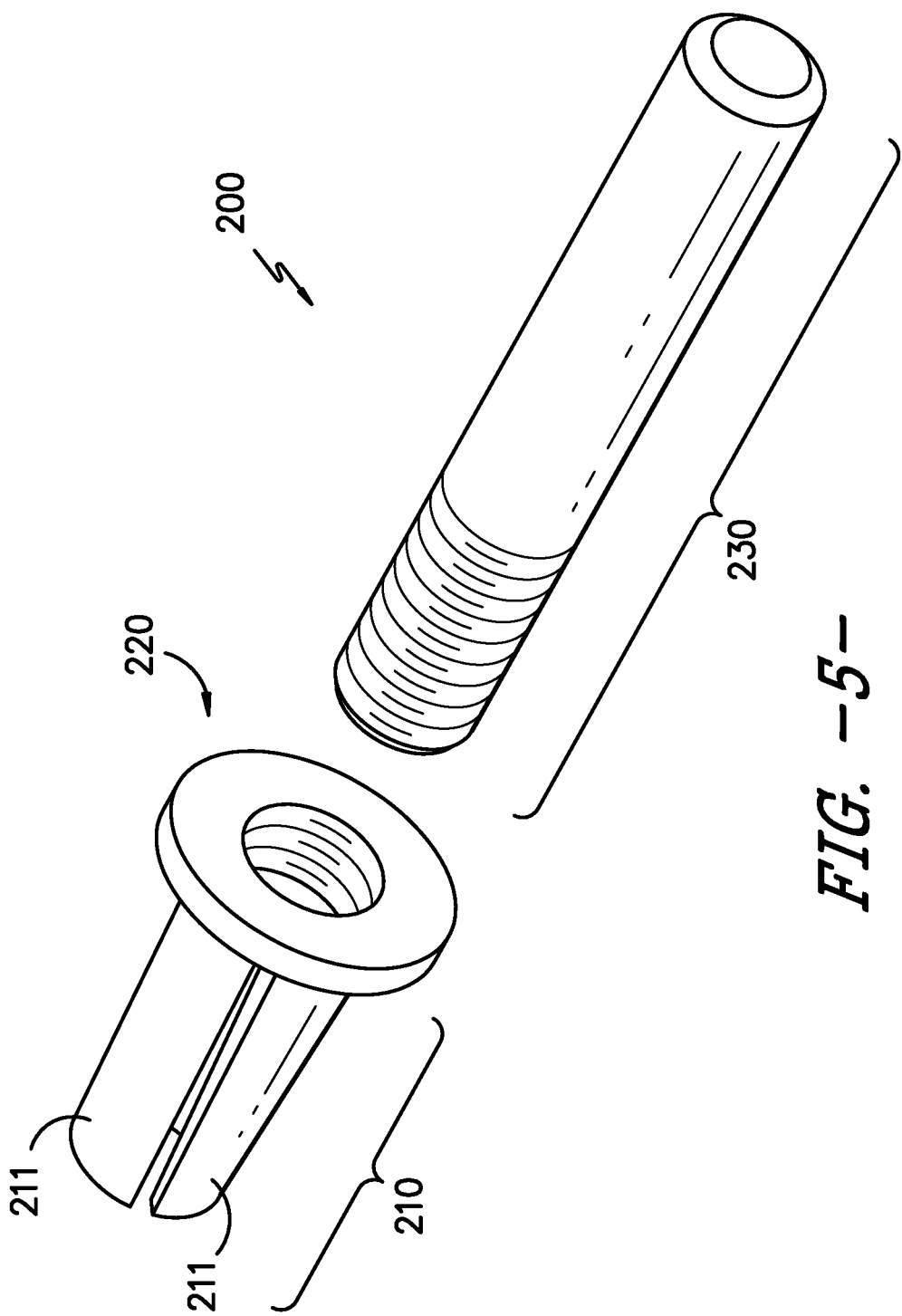
FIG. -5-

SYSTEM FOR APPLYING A WEB AROUND A CYLINDRICAL OBJECT WITH EVEN TENSION

TECHNICAL FIELD OF THE INVENTION

The invention provides a system and method for applying a web around a cylindrical object with even tension.

BACKGROUND

Pipes (and other cylindrical objects such as conduits and the like) are used to transport materials (solids, liquids, and gases) across distances. Over time, the pipes and conduits may have defects form which must be fixed. These defects are defined to be anything that impacts the structural integrity of the cylindrical object or that is or has the possibility of leaking. Such pipes themselves may be deployed in environments that also subject the exterior of the pipe to corrosive or otherwise physically or chemically damaging conditions. Where cylindrical objects are joined together could be considered a defect for the possibility of leaking. Pipes may exhibit mechanical damage, including the growth of micro-cracks that can be induced from crimp connections. Of course, this is undesirable where such defects could allow for leaking, posing dangers to individuals or the environment.

When applying rolled goods in the form of webs to the circumference of a pipe, it is difficult to control the "lay down" since the webs tend to bag in the center and have therefore have uneven tension.

There is a need for a system to enable an installer to eliminate or reduce the bagging of the web be able to control the tension of the web as it is wrapped around the pipe circumference.

BRIEF SUMMARY OF THE INVENTION

A system for applying a web around a cylindrical object with even tension containing a core having a generally cylindrical shape and a pair of handles. Each handle has an insertion area, a collar area, and a gripping area. The collar area is sandwiched between the insertion area and the gripping area and the insertion diameter is less than the inner diameter of the core at the first end and second end. The handles and core have a means for coupling meaning that the core and the insertion area of the handles do not move independently from one another. A method of applying a web around a cylindrical object with even tension is also disclosed.

BRIEF DESCRIPTION OF THE FIGURES

An embodiment of the present invention will now be described by way of example, with reference to the accompanying drawings.

FIG. 1 illustrates schematically one embodiment of the system.

FIG. 2 illustrate schematically embodiment of the handle of FIG. 1.

FIG. 3 illustrates schematically another embodiment of the system.

FIG. 4 illustrate schematically embodiment of the handle of FIG. 3.

FIG. 5 illustrates schematically another embodiment of the handle.

DETAILED DESCRIPTION OF THE INVENTION

Referring to FIG. 1, there is shown one embodiment of the system for applying a web around a cylindrical object with even tension 10. The system 10 contains a core 100 and a pair of handles 200.

The core 100 has a generally cylindrical shape with a circumference, a length, a wall, an inner diameter, and an outer diameter. The wall has a thickness defined to be the distance between the inner diameter and the outer diameter. The core also has a first end a second end. The core and the handle contain means to be able to couple together serving to prevent the core 100 from spinning independent of the handles 200.

Preferably, the wall of the core 100 has a thickness of between about 0.2 and 1 inch, more preferably between about 0.25 and 0.7 inch. The core may be made of any suitable material depending on the material to be placed on it. It may be cellulose (such as a cardboard), plastic, or metal.

The system 10 further comprises a pair of handles 200. Alternative views of the handles can be seen in FIGS. 2 and 3. The handles 200 contain 4 main parts; an insertion area 210, a collar area 220, a gripping area 230, and a recess 240. The insertion area 220 of the handles 200 have a generally cylindrical shape with a insertion diameter less than the inner diameter of the core 100 at the first end and second end such that the insertion area 210 of the handle 200 extends into the core 100. When the handles 200 are inserted into the core 100, the handles 200 are inserted the approximate length of the insertion area 210. The insertion area 210 preferably has a length of between about 1 and 4 inches and will depend on the length of the core 100.

In one embodiment, the insertion area is tapered. In this embodiment, the insertion diameter is largest at the end of the insertion area closest to the collar area and smallest at the end of the insertion area farthest from the collar area. It has been found that a taper helps fit into cores more easily sometimes.

The collar area 220 is sandwiched between the insertion area 210 and the gripping area 230 and has a generally cylindrical shape with a collar diameter that is larger than the inner diameter of the core at the first end and second end. In some embodiments, the collar area 220 prevents the handle 200 from being inserted too far into the core 100. The collar 220 is also where the locating pins 240 are located and will typically have a length of between about 0.5 and 1.5 inches, more preferably between about 0.125 and 0.5 inches.

The gripping area is where the installer would hold the handles 200 (and therefore the system 10). The gripping area has a generally cylindrical shape with a gripping diameter that is a comfortable for hand hold. The gripping area may have additional features to prevent slippage such as a roughened surface area or coating. The gripping area 230 of the handles 200 is typically between about 3 and 7 inches in length, a comfortable length for an operator to grip onto.

The handle 200 may be formed in any suitable manner. Any combination of the parts 210, 220, 230, 240 may be made separately and then are assembled together or may be formed together. In one embodiment, the insertion area, collar area, and gripping area are formed from a single unitary piece of material. The handles may be made out of any suitable material, such as a metal or plastic. The handles may be made by, for example, machining them out of the block of material, molding them into shape, and 3D printing them. The handles may be any suitable material that allows for the desired end use. In one embodiment, the handles comprise metal. In another embodiment, the handles comprise a polymer. In another embodiment, the handles comprise both metal and a polymer.

In one embodiment, the handles 200 are formed such that the gripping area 230 can be rotated independently from the collar are 220, insertion area 210, and locating pins 210. This may be preferred in some embodiments for the ease of wrapping a pipe or other cylindrical object.

The core may have any suitable length, but the smaller the length of the core, the less of an issue the applying a web around a cylindrical object with even tension is. Preferably, the core has a length of at least about 6 inches, more preferably at least about 10 inches. In another embodiment, the core has a length of between about 4 and 24 inches, more preferably between about 6 and 18 inches.

In the embodiment of FIGS. 1 and 2 (FIG. 1 being the system and FIG. 2 being a close up of the handle), the means for coupling the handle and the core together is through the use of tabs on the core and matching recesses on the handle. The inner wall of the core has a at least one tab 120 extending from the inner diameter center area of the core and preferably extends at least 1 inch from the first end and second end. There may be 1 tab, 2 tabs, 3 tabs, 4 tabs or more. The tabs 120 are preferably equally spaced about the circumference of the core.

The handle 200 contains at least one recess 240 in the insertion area of the handle, preferably the number of recesses 240 matches the number of tabs 120. The recesses have a depth, width, and length that allows the recesses and tabs to couple and nest such that the core and the insertion area of the handle cannot move independently form one another and serve to prevent the core 100 from spinning independent of the handles 200.

In the embodiment of FIGS. 3 and 4 (FIG. 3 being the system and FIG. 4 being a close up of the handle), the means for coupling the handle and the core together is through the use of tabs on the handle and matching recesses in the core. The inner wall of the core has a at least one recess 130 extending into the thickness of the wall from the inner surface of the core and preferably extends at least 1 inch from the first end and second end. There may be 1 recess, 2 recesses, 3 recesses, 4 recesses or more. The recess 130 are preferably equally spaced about the circumference of the core.

The handle 200 contains at least one tab 250 in the insertion area of the handle, preferably the number of tabs 250 matches the number of recesses 130. The recesses have a height, width, and length that allows the recesses and tabs to couple and nest such that the core and the insertion area of the handle cannot move independently form one another and serve to prevent the core 100 from spinning independent of the handles 200.

Referring now to FIG. 5, there is shown an alternative embodiment to the handle 200. The insertion area of the handle 210 is split into 2 or more pieces 211 and the there is a hollow area within the insertion are 200 and the collar are 220 that the handle 230 is inserted into. As the handle 230 is inserted (can be pushed in or screwed in, for example), it pushes the pieces 211 outward putting pressure on the core and coupling the core and the handle together. This may be a preferred embodiment as there are no modifications to the core needed and standard cores may be used. This embodiment works similarly to a dry wall anchor in a dry wall system.

A web is wrapped around the core. The web may be any suitable elongated, flat material such as a plastic film or fabric. In one embodiment, the web is used to reinforce or fix a cylindrical object such as a pipe or conduit. Preferably, the web is a fabric web which is saturated with a curable polymer material. The system has the added benefit of providing handles to reduce the amount of curable polymer that gets on the hands of the installer. Once the web is wrapped around the cylindrical object, the curable polymer material is cured (using ambient conditions or added heat, UV, or other energy). This wrapping can serve as a fix for a defect in the surface of the cylindrical object or as a reinforcement for the cylindrical object or in a connection between two or more cylindrical objects.

Preferably, the web is a woven textile. The woven textile contains warp yarns in a first direction (along the length direction of the woven textile) and weft yarns which are at approximately 90 degrees to the warp yarns. The mechanical properties of the web have been found to be improved having the warp and weft yarns at approximate right angles to each other.

The method of applying a web around a cylindrical object (such as a pipe, tank, conduit) with even tension begins by identifying a cylindrical object in need of reinforcement or fixing. The cylindrical object may be optionally cleaned so that the web applied will have better adhesion.

The system for applying the web is assembled. The system contains a core having a generally cylindrical shape with a circumference, a length, a wall, an inner diameter, an outer diameter, a first end, a second end. The core contains a web (preferably a fabric web) wrapped around the core, ready to be delivered onto the cylindrical object.

The system also contains a pair of handles, wherein each handle has an insertion area, a collar area, a gripping area. The collar area is sandwiched between the insertion area and the gripping area. The insertion area of the handles have a generally cylindrical shape with an insertion diameter less than the inner diameter of the core at the first end and second end. The insertion area is connected to the collar area, the gripping area has a generally cylindrical shape with a gripping diameter, the gripping area is connected to the collar area. The core and the handle contain means to be able to couple together serving to prevent the core 100 from spinning independent of the handles 200.

The handles are inserted the first and second end of the core and are coupled with the core. The operator holds the gripping area of the handles when applying the web to the cylindrical object.

The web is then wrapped around the cylindrical object (while simultaneously unwrapping from the core). The web is then optionally cured or had other processes applied to it to create a strengthening element for the cylindrical object.

In a conventional method, the person applying the web places their fingers into the core to act as a shaft. Their thumbs are then placed on the edges of the material as it is wrapped around the pipe. The pressure exerted by the thumbs causes tension to be placed on the edges while the center of the roll can "bag" or be loose causing wrinkles to appear on the reinforcing material. These wrinkles then need to be worked out by rubbing the surface. The handles when inserted into the core become a shaft. The person applying the reinforcing material can then put pressure on the handle potion (230) which then applies an even tension along the entire width of the material elimination "bag" or loose material in the center. In general, this method keeps the warp and weft fibers perpendicular (90°) to one another. By doing so, the material preforms at its maximum mechanical properties.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A system for applying a web around a cylindrical object with even tension comprising:

a core having a generally cylindrical shape with a circumference, a length, a wall, an inner diameter, an outer diameter, a first end, a second end; and, a pair of handles, wherein each handle has a insertion area, a collar area, a gripping area, wherein the collar area is sandwiched between the insertion area and the gripping area, wherein the insertion area of the handles have a generally cylindrical shape and a length with a insertion diameter less than the inner diameter of the core at the first end and second end, wherein the insertion area is connected to the collar area, wherein the gripping area has a generally cylindrical shape with a gripping diameter, wherein the gripping area is connected to the collar area, wherein the handles and core comprise a means for coupling selected from the group consisting of the insertion area of the handles comprising at least one tab with the wall of the core comprising at least one matching recess and insertion area of the handles comprising at least one recess with the wall of the core comprising at least one matching tab, wherein the tabs and recesses have a length, and wherein the length of the tabs and recesses runs along the length of the generally cylindrical shape of the insertion area of the handles.

2. The system of claim 1, wherein the core has a length of at least about 6 inches.

3. The system of claim 1, wherein the collar area of the handles have a generally circular cross-section and have a larger diameter than the insertion area of the handle and the inner diameter of the core.

4. The system of claim 1, wherein the insertion area, collar area, and gripping area are one unitary piece.

5. The system of claim 1, wherein the gripping area and the collar area are able to be rotated independent of the insertion area.

6. The system of claim 1, further comprising the web wound onto the core.

7. The system of claim 6, wherein the web comprises a fabric saturated with a curable polymer material.

8. The system of claim 1, wherein the cylindrical object is a pipe or conduit.

9. The system of claim 1, wherein the insertion area is tapered where the insertion diameter is largest at the end of the insertion area closest to the collar area and smallest at the end of the insertion area farthest from the collar area.

* * * * *